April 14, 1964 A. LEEN 3,129,332
ULTRA-VIOLET DETECTOR SYSTEMS
Filed July 10, 1961 2 Sheets-Sheet 1
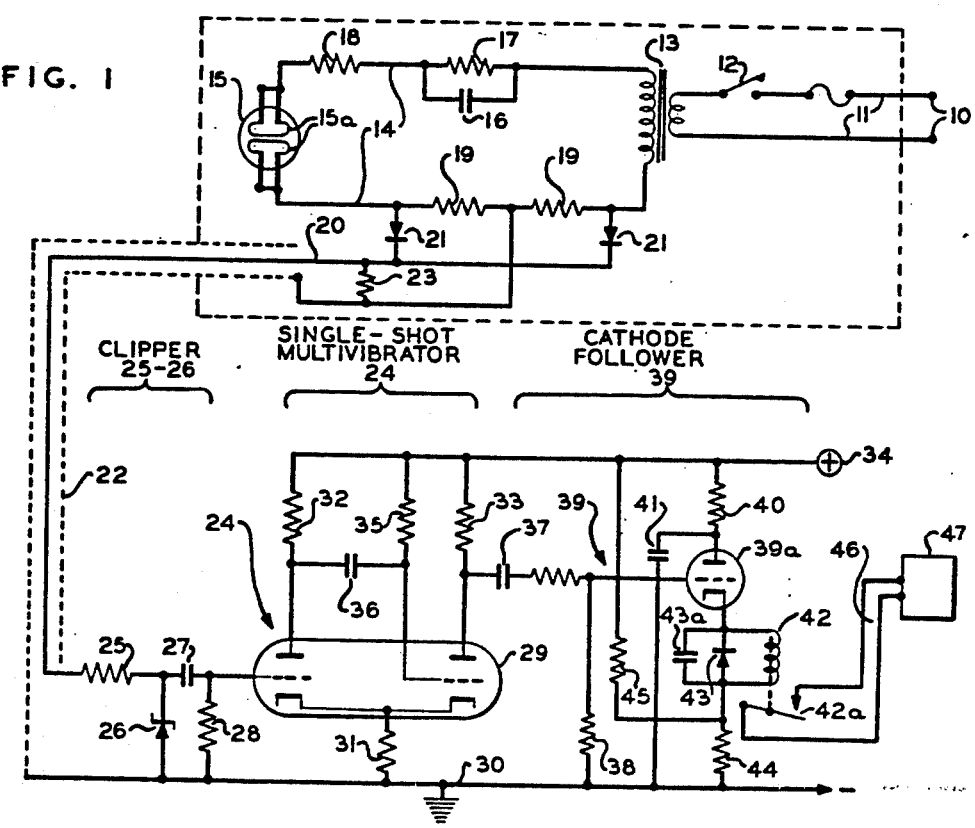
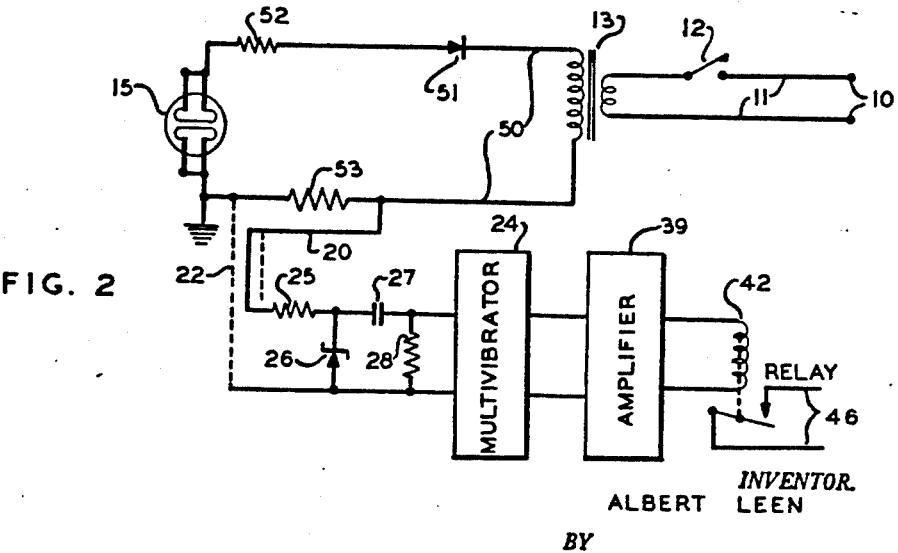
INVENTOR.
ALBERT LEEN
BY
George H. Fritzinger
AGENT INVENTOR.
ALBERT LEEN
BY
George H. Fritzinger
AGENT United States Patent Office 3,129,332
Patented Apr. 14, 1964

3,129,332
ULTRA-VIOLET DETECTOR SYSTEMS
Albert Leen, West Caldwell, N.J., assignor to McGraw-Edison Company, Elgin, Ill., a corporation of Delaware
Filed July 10, 1961, Ser. No. 122,774
10 Claims. (Cl. 250—83.3)

This invention relates to ultraviolet (herein designated U-V) detector systems using preferably detector tubes of the type described in the pending Howling application Serial No. 801,625, filed March 24, 1959, now Patent No. 3,047,761. More particularly, the invention relates to novel U-V detector systems wherein such U-V detector tube is utilized to trigger a multivibrator which in turn operates a load device.

An object of the invention is to provide a U-V detector system which will respond in a stable manner and with improved sensitivity to U-V radiation below the saturation level.

Another object is to provide such improved U-V detector systems which have a substantially faster response.

Another object is to provide an improved U-V detector system which has a uniform output even when triggered by incident photon radiation below the saturation level.

The U-V detector tubes above mentioned are preferably made of a symmetrical electrode construction capable of passing A.C. current. The tubes are operated from a pulsing source of voltage as from an applied A.C. voltage wherein the successive half waves are considered as voltage pulses of opposite polarity or from a rectified A.C. source wherein the successive pulses are of the same polarity. The applied voltage pulses must exceed the firing voltage for the tube which is typically approximately 700 volts. If at the moment the applied voltage is at the firing potential the tube is excited by incident photons, the tube is triggered into an avalanche discharge which continues until the applied voltage falls to an extinction potential typically about 330 volts. Thus each discharge is quenched by the drop in the applied voltage at the end of each applied voltage pulse.

If a tube is receiving photon radiation at a saturation level it will be triggered during each applied voltage pulse the instant the applied voltage reaches the firing potential and will continue to pass current until the applied voltage falls to the extinction potential. The output pulses to a work circuit are uniform under these conditions and enables an output relay to be operated in a stable manner with a minimum integration in the output circuit. However, in practice the incident photon radiation to be detected is often substantially below the saturation level. Under these conditions, the U-V tube may be triggered at any instant during that portion of each applied voltage pulse wherein the applied voltage is above the firing potential, with the result that the duration of the discharge pulses will vary substantially. For example, weak photon radiation capable of triggering the U-V tube in a random manner may require increased integration in the coupling circuits with a resultant slower response and lower sensitivity or otherwise may cause an output relay to chatter and give an unreliable response.

In accordance with the present invention each discharge pulse from the U-V tube is utilized regardless of its duration to trigger a one-shot multivibrator. Once such multivibrator is triggered it gives out a uniform pulse of predetermined magnitude and duration determined by the timing of the multivibrator, regardless of the duration of the input pulse from the U-V tube. Thus, the variable discharge pulses from the U-V tube are, in effect, converted respectively into uniform output pulses capable of energizing a work circuit or a load device such as a relay in stable and dependable manner even though the incident photon radiation is well below the saturation level.

The timing of the multivibrator is chosen so that each output pulse therefrom will end before a next succeeding discharge of the U-V tube can start. As will appear, for an A.C. applied potential of a one thousand volt peak value the period between the latest instant a discharge can occur on one-half cycle and the earliest instant it can begin on the next half cycle is approximately ninety degrees, making therefore a suitable duration for each output pulse from the multivibrator of the order of eighty degrees. The duration of discharge pulses from photon radiation above the saturation level—i.e., the period from the instant the firing voltage reaches 700 volts to the instant it has fallen to approximately 330 volts during a one-half cycle of applied voltage—is of the order of one hundred-fifteen degrees. The minimum discharge pulse—i.e., the period from the instant the applied potential has fallen to 700 volts to the instant it has fallen to 330 volts—is of the order of twenty-five degrees. The output pulses from the multivibrator are therefore under these conditions about seventy percent as long as the maximum discharge pulse obtained under saturated photon radiation and about three times longer than the minimum discharge pulse. Although the length of each output pulse from the multivibrator is thus substantially shorter than the maximum discharge pulses obtained from the U-V tube circuit the output power is maintained by designing the multivibrator to feed out a voltage signal of a sufficiently great magnitude. The output pulses from the multivibrator then have not only better than three times the duration of the minimum discharge pulses but also a substantially higher level to give a very much greater sensitivity of the system to U-V radiation below the saturation level.

These and other objects and features of the invention will be apparent from the following description and the appended claims.

In the description of the invention reference is had to the accompanying drawings, of which:

FIGURE 1 is a schematic circuit diagram of a U-V detector system illustrating the invention for the condition of an applied A.C. voltage across the U-V detector tube;

FIGURE 2 is a schematic circuit diagram illustrating the invention for the condition of applied D.C. voltage pulses across the U-V detector tube;

Figure 4:
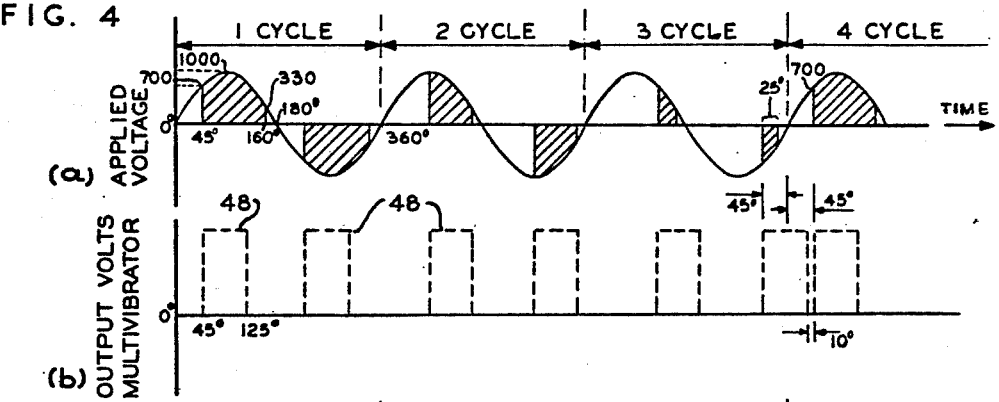
Figure 5:
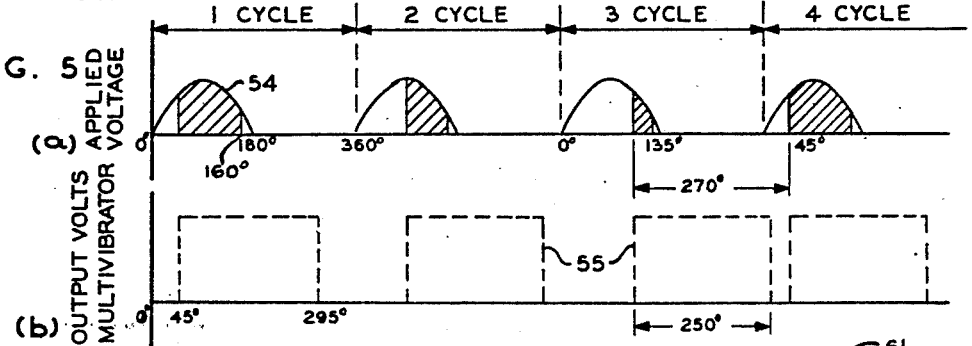

FIGURE 4 shows in chart (a) an A.C. source of applied voltage for the U-V tube wherein varying discharge periods are represented by shaded areas, and in chart (b) the corresponding output pulses from the multivibrator; and FIGURE 5 shows in chart (a) a series of half-way rectified pulses of applied voltage across the U-V tube wherein varying discharge periods are represented by shaded areas, and in chart (b) the corresponding output pulses from the multivibrator.

The U-V detector system shown in FIGURE 1 is operated from a 60 cycle 110 volt power line designated by the terminals 10. This power source is connected through a primary circuit 11 and an on-off power switch 12 to the primary winding of a voltage step-up transformer 13 to supply a firing voltage typically of 1000 volts peak value to a secondary circuit 14. The secondary circuit includes a U-V tube 15 connected in series with a condenser 16 shunted by a resistor 17, a current limiting resistor 18 and a pair of load resistors 19. In accordance with the teaching of the pending Johnson and Leen application Serial No. 83,755, filed January 19, 1961, the condenser 16 allows an initial "spike" of current limited by the resistor 18 when the U-V tube is triggered to produce a glow discharge through the entire working region of the tube— the region wherein the emission of electrons are capable of triggering an avalanche discharge. However, the time constant of the condenser 16 and resistor 18 is such that each current pulse will decay rapidly and prevent overheating of the electrodes 15a of the tube to a point where they cound trigger the tube by thermionic emission. The advantage of the initial current "spike" is to extend the glow discharge to the working region and clean the electrodes of contaminants such as alkali metal ions from the glass envelope of the U-V tube. The advantage of connecting the resistor 17 across the condenser 16 is reduce the possibility of multiple counting—i.e., a condition wherein the probability of the U-V tube being triggered by a given radiation is increased during successive applied voltage pulses because of the residual charge on the condenser 16 at the end of each conducting half cycle. As typical values, the condenser 16 may be .1 microfarad, the resistor 18 may have 3500 ohms, the resistor 17 may have 68,000 ohms and the resistors 19 may each be 200 ohms.

An output lead 20 is connected through respective halfway rectifiers 21 to the outer terminals of the load resistors 19, and a shield 22 for this output lead is connected to the center terminal of the resistors 19. A high resistor 23 of the order of 100,000 ohms is connected between the lead 20 and the shield 22 at the rectifiers 21. The single lead 20 with its shield 22 constitutes the sole output connection from the U-V tube circuit to a pulse forming means preferably a single-shot multivibrator 24. In practice, the multivibrator is located at a receiving station remote from the U-V tube 15.

At the input of the multivibrator 24 there is connected a series resistor 25 and a Zener diode 26 typically a 653C9 diode operating as a voltage clipper to assure a uniform input voltage to the multivibrator. The clipper is connected through a series isolating capacitor 27 and a shunt resistor 28 to the grid of the multivibrator tube 29. The tube 29 may be a dual triode, typically type 12AU7, having a common cathode bias resistor 31 connected to ground. The plate electrodes are connected through respective load resistors 32 and 33 to a positive source 34 of D.C. potential. The grid electrode of the second triode section is connected through a resistor 35 also to the positive potential source 34 and through a coupling condenser 36 to the plate of the first triode. The output from the multivibrator is fed through an isolating condenser 37 and across a grid resistor 38 to the grid electrode of an amplifier stage 39 comprising a thermionic tube 39a, typically a 6C4 tube, connected as a cathode follower. The plate electrode of this follower tube is connected through a resistor 40 to the positive potential source 34 and through a condenser 41 to ground. The cathode of this tube is connected through a relay 42 shunted by a rectifier 43 and through a resistor 44 to ground. The resistor 44 constitutes the lower leg of a voltage divider providing a suitable cathode bias the upper leg of which is a resistor 45 connected to the positive potential source 34. A condenser 43a may be connected in parallel with the relay coil to provide increased integration time if desired.

Typical values for the resistor and condenser elements of the multivibrator and cathode follower circuits are as follows: resistor 31, 3.7K; resistor 32, 47K; resistor 33, 47K; resistor 35, 2.2M; condenser 36, .01 mfd.; condenser 37, .01 mfd.; resistor 38, 12.5K; resistor 40, 1K; condenser 41, 2 mfd.; resistor 44, 1.5K, and resistor 45, 12.5K.

The input triode of the multivibrator tube 29 is biased to cutoff. Upon a positive input voltage pulse being impressed on the grid of the first triode a negative voltage is fed through the condenser 36 to the grid of the second triode to render it non-conductive. This non-conductive state is maintained for a duration depending upon the RC time constant of the resistor 35 and condenser 36, causing the second triode to feed out a positive pulse of uniform magnitude for a predetermined duration. The output pulse renders the cathode follower conductive to operate the relay 42. The relay has a pair of contacts 42a which are operated to control a circuit 46 leading to any utilization device 47 diagrammatically indicated. The inertia of the moving armature of the relay provides an integration time, which may also be augmented by the condenser 43a abovementioned, to require a series of output pulses from the multivibrator, typically from three to eight pulses, before the relay is operated. This is beneficial in preventing response to random discharge pulses from the U-V tube such as may occur responsive to cosmic rays.

In FIGURE 4A there is shown a sine wave voltage of approximately 1000 volts peak value as representing the applied voltage on the U-V tube in the system represented by FIGURE 1. The shaded areas in this figure represent portions of each half wave of the applied voltage during which the U-V tube may be triggered into a conductive state. When the instant photon radiation at the U-V tube is at a saturation level the tube is triggered the instant the applied voltage reaches about 700 volts and is quenched when the applied voltage falls to about 330 volts. The discharge pulse responsive to a saturation level of incident photon radiation is illustrated in the first cycle of applied voltage by the shaded area starting at about 45 degrees from zero and ending about 160 degrees from zero. However, if the photon radiation is below the saturation level the U-V tube is triggered on a statistical basis at any instant within each portion of an applied voltage pulse wherein the applied voltage is at or above the firing voltage of 700 volts—i.e., from 45 degrees to 135 degrees from zero of each half cycle pulse as illustrated for the second and third cycles of the applied voltage in FIGURE 4A. The duration of the discharge pulses from the U-V tube are therefore subject to a several times variation running from 115 degrees maximum to 25 degrees minimum of each half cycle period of applied voltage. The integration time in the circuit to the relay must be relatively large in order for a series of such small discharge pulses to operate the relay and the response of the system would in such case be slow. On the other hand, if the integration time is relatively small such small discharge pulses may not reach an integrated value sufficient to operate the relay and may cause the relay to chatter.

The present invention takes into account the fact that each discharge pulse from the U-V tube is operative regardless of how short the discharge pulse may be to trigger the multi-vibrator 24. Thus, upon feeding the discharge pulses into the multivibrator there is obtained a series of uniform output pulses of the frequency of the input discharge pulses even when the photon radiation at the U-V tube is considerably below the saturation level. This is shown in FIGURE 4B wherein the successive blocks 48 represent the output pulses of the multivibrator responsive to the respective discharge pulses illustrated in FIGURE 4A. It is desired, as beforementioned, that each output pulse 48 from the multivibrator shall end before a successive discharge pulse arrives from the U-V tube. As shown for the third and fourth cycles in FIGURE 4A, the latest a discharge pulse can start is 45 degrees from the end of the half cycle and the earliest a successive discharge pulse can start is 45 degrees from zero on the next half cycle, leaving a maximum gap of 90 degrees. A suitable maximum duration for each output pulse from the multivibrator is under these conditions of the order of 80 degrees, leaving a 10 degree gap minimum between the end of an output pulse from the multivibrator and the start of the next possible discharge pulse from the U-V tube.

In FIGURE 2 a modified form of the invention is illustrated wherein the U-V tube 15 is operated from applied uni-directional pulses. As before, the U-V detector system is connected to a power source 10 through a primary circuit 11 and an on-off switch 12 and the voltage from this source is stepped up by the transformer 13 to provide approximately 1000 volts peak value in the secondary circuit 50. The secondary circuit serially includes a half wave rectifier 51, resistor 52, the U-V tube 15 and a load resistor 53 across which is connected the output circuit 20—22 leading through a clipper 25—26 and through coupling circuit 27—28 to the input of the multivibrator 24. The output of the multivibrator is again connected through a cathode follower stage 39 to the relay 42.

In FIGURE 5A there is shown a series of rectified half cycle voltage pulses such as would be obtained across the U-V tube from the circuit of FIGURE 2. The shaded areas represent the periods during which the U-V tube may be triggered into a conductive state, it being assumed again that the half-wave pulses have a peak value of 1000 volts and that the U-V tube can be triggered when the applied voltage is 700 volts or higher. When the photon radiation is at the saturation level the tube is triggered the instant the applied voltage reaches the firing potential 700 volts and is quenched when the voltage falls to the extinction voltage of 330 volts as shown by the shaded area for the first half cycle 54. If the photon radiation is below the saturation level the tube 15 may be triggered at any instant during the portion of each half cycle in which the applied potential is at or above the firing voltage. The firing is illustrated as taking place when the applied voltage is at its peak value in cycle 2, when it is at the end of the firing period in cycle 3 and when it is at the beginning of the firing period in cycle 4. In FIGURE 5B the successive blocks 55 represent the successive output pulses from the multivibrator for the respective discharge pulses from the U-V tube in FIGURE 5A. As before, it is desired that each multivibrator pulse shall end before a succeeding discharge pulse from the U-V tube can start. As shown by the third and fourth cycles of FIGURE 5A the latest a discharge pulse can start is 135 degrees from the beginning of a cycle and the earliest another pulse can start is 45 degrees from the beginning of the next cycle, giving a maximum gap of 270 degrees. A desired maximum duration for each output pulse 55 for the multivibrator is under these conditions of the order of 250 to 260 degrees, leaving a gap of from 10 to 20 degrees between the end of an output pulse from the multivibrator and the start of a next succeeding discharge pulse.

It has been found that when the U-V detector system shown in FIGURES 1 and 2 are compared with analogous systems differing only in that the output relay is operated directly from the U-V tube circuit in the manner illustrated in the Johnson-Leen application, supra, the response of the present circuits is approximately three times faster than that from the corresponding former circuits. For instance in the system shown in FIGURE 1 the relay 42 will operate in .8 second when the U-V radiation is at a weak level substantially below saturation. Under the same operating conditions the prior system without the multivibrator would operate the relay in 2.4 seconds. Furthermore, the system of FIGURE 1 will respond to a match flame ten or more feet away from the U-V detector tube whereas the corresponding system without the multivibrator would respond to a match flame at no more than about two feet from the detector tube.

Figure 3:
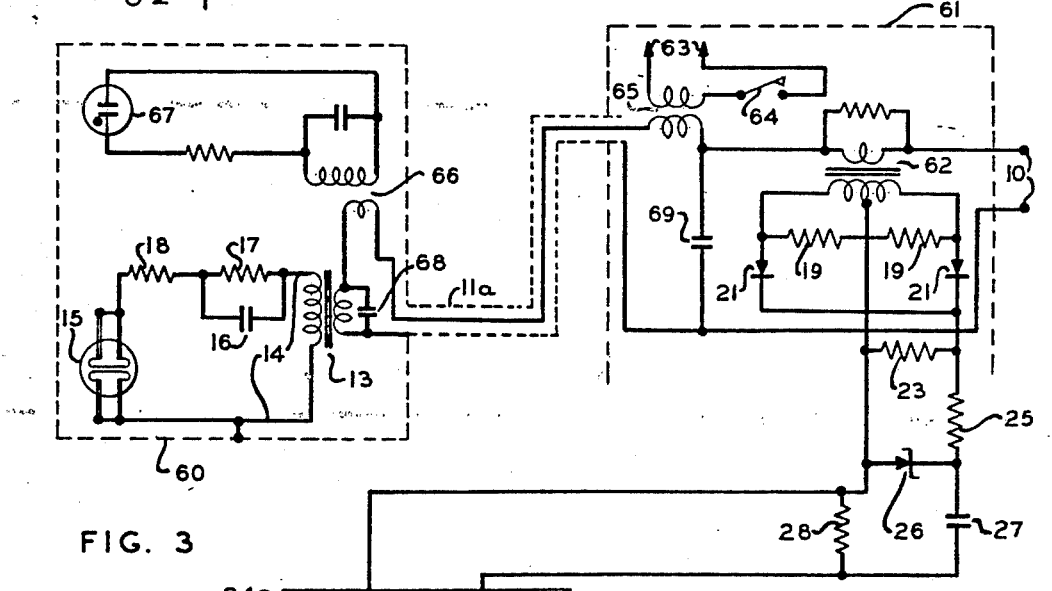
FIGURE 3 is a schematic circuit diagram illustrating another form of the invention adapted to permit the U-V tube to be remote from the receiving station, including a high frequency test signal superimposed on the circuit for testing the operation of the system under simulated actual conditions from the receiving station.

The circuit arrangement shown in FIGURE 3 permits the U-V tube to be located at a remote station as described in the pending Dietz application Serial No. 86,341, filed February 1, 1961. Moreover, this circuit arrangement incorporates a means for testing the sytem for operability under simulated actual conditions. For example, the secondary circuit 14 of the transformer 13 may include the condenser 16 and resistor 17 in parallel, the current limiting resistor 18 and the U-V tube 15, the same as shown in FIGURE 1 except that the circuit does not include any load resistances. These circuit elements are mounted in a protective container 60 diagrammatically shown with the U-V tube exposed through one end wall thereof to form a probe unit. This probe unit is located at any remote station to be monitored for U-V radiation. The only circuit leading from the probe unit is the primary circuit of the transformer 13 here shown as constituting a single shielded wire 11A. At the home or receiving station 61 this primary circuit is connected to the A.C. power source 10. The utilization circuit is in this case coupled by a transformer 62 to the primary circuit to detect the changes in the primary circuit when the U-V tube is triggered into a conductive state. For this purpose a transformer 13 is used which is tightly coupled and which has low leakage. The second winding of the coupling transformer 62 is connected through the full wave rectifier 19—21, clipper 25—26, coupling 27—28, multivibrator 24 and amplifier 39 to the relay 42, the same as the relay 42 is connected to the secondary circuit in FIGURE 1. By using a transformer 62 having substantially the same step-up ratio as the transformer 13 substantially the same level of voltage pulses are fed to the multivibrator as when the same is connected to the secondary circuit 14 in the manner shown in FIGURE 1. The operation of the relay responsive to photoradiation at the U-V tube is accordingly substantially the same as for the circuit of FIGURE 1.

At the receiving station 61 there is also provided a source 63 of test current of a frequency which is high relative to that of the A.C. power source 10. This test source is coupled through a test switch 64 and transformer 65 to the primary circuit 11a between the coupling transformer 62 and the probe unit. In the probe unit 60 the primary circuit is also coupled by a transformer 66 to an argon-filled glow discharge tube 67 positioned adjacent to the U-V tube 15. A condenser 68 bypasses the high frequency test current from the primary of the step-up transformer 13 and a condenser 69 bypasses the test current from the utilization circuit at the receiving station. When the test switch 64 is closed the flow discharge tube 67 is activated without directly affecting the U-V tube or the utilization circuit. However, the U-V radiation from the flow tube will trigger the U-V tube 15 into a conductive state during each applied voltage pulse and a resultant current discharge in the secondary circuit 14 will cause a corresponding voltage pulse to flow in the primary circuit 11a and to trigger the multivibrator 24 and operate the relay 42 provided the entire detector system is in a proper operating condition.

The embodiments of my invention herein particularly shown and described are intended to be illustrative and not necessarily limitative of the invention since the same are subject to changes and modifications without departure from the scope of my invention, which I endeavor to express according to the following claims.

I claim:

1. A U-V detecting system comprising a U-V detector tube having electrodes in an adjacent relationship providing a working region responsive to incident photons when a firing voltage is applied across said electrodes to trigger a glow discharge, means for applying successive pulses of a firing voltage across said electrodes of which each pulse falls below the extinction voltage at which a discharge then existing is quenched before the next voltage pulse is applied, a pulse forming means effective when triggered by an input voltage to produce a single output pulse of predetermined magnitude and predetermined duration, means connecting the input of said pulse forming means in circuit with said U-V detector tube, and a utilization device connected to the output of said pulse forming means.

2. The U-V detecting system set forth in claim 1 wherein said U-V detector tube has a symmetrical construction enabling it to pass A.C. current responsive to an applied A.C. voltage, wherein said voltage applying means is a sinusoidal source of A.C. voltage of a predetermined frequency such that a predetermined time period elapses from the instant the applied voltage falls to the extinction potential at the end of one-half wave to the instant the applied voltage rises to a firing potential during the next half wave, and wherein said pulse forming means constitutes a multivibrator set so that the duration of each output pulse thereof is less than said predetermined time period.

3. The detecting system set forth in claim 2 wherein said multivibrator is responsive only to an input voltage of predetermined polarity, including a full wave rectifier interposed between said circuit of said U-V detector tube and said multivibrator to feed successive pulses to said multivibrator of said polarity during successive one-half wave conductive cycles of said U-V detector tube.

4. The U-V detecting system set forth in claim 1, wherein said voltage applying means is a sinusoidal source of A.C. voltage including a half-wave rectifier in series with said U-V detector tube whereby alternate half-wave pulses are fed to said pulse forming means of predetermined polarity upon said U-V detector tube being excited by incident photons, and wherein said pulse forming means is set so that the duration of each output pulse thereof is less than the time interval between the latest instant a firing can occur during one applied pulse and the earliest instant a firing can occur during the next succeeding applied pulse.

5. A U-V detecting system comprising a U-V detector tube having a symmetrical electrode construction enabling the tube to pass A.C. current when the tube is excited by incident photons and an A.C. firing voltage is applied across the tube, a single-shot multivibrator responsive to each input voltage of a predetermined polarity to produce an output voltage pulse of predetermined magnitude and duration, full-wave rectifying means connected between the circuit of said U-V detector tube and the input of said multivibrator for feeding successive voltage pulses of said predetermined polarity to said multivibrator when said U-V detector tube is passing A.C. current, clipping means in the input circuit of said multivibrator for limiting the input voltage thereto to a predetermined value, and a utilization circuit connected to the output of said multivibrator.

6. A U-V detecting system comprising a U-V detector tube having electrodes in an adjacent relationship providing a working region responsive to incident photons when a firing voltage is applied across said electrodes to trigger a glow discharge between the electrodes, an A.C. power source of voltage and circuit means connecting the same to said U-V detector tube to apply successive voltage pulses of a firing magnitude across the tube, a utilization device connected to said U-V detector tube for response thereto when the U-V detector tube is triggered to pass current, a test source of A.C. voltage of high frequency relative to that of said A.C. power source, a glow discharge tube mounted adjacent to said U-V detector tube and connected to said test source of A.C. voltage via said circuit means for producing a test source of radiation for exciting said U-V detector tube, capacity shunt means in said circuit means for isolating said test source of voltage from said U-V detector tube, and a test switch for connecting said test source of voltage to said circuit means at will.

7. The U-V detecting system set forth in claim 6 including a voltage step-up transformer connecting said A.C. power source to said U-V detector tube, means connecting said test source of voltage via said test switch to the primary circuit of said transformer at a point remote from said transformer, a bypass condenser across the primary winding of said transformer to prevent feed of test voltage to said U-V detector tube, and a voltage step-up transformer between said primary circuit and said glow discharge tube for causing the glow discharge tube to be activated when said test switch is closed.

8. The detector system set forth in claim 7 wherein said utilization device is connected in the primary circuit of said transformer for response to said U-V detector tube when the tube is triggered to pass current including bypass means connected to said utilization device for preventing activation of the utilization device by said test source of voltage when said test switch is closed.

9. A U-V detecting system comprising a U-V detector tube adapted to pass A.C. current when an A.C. voltage of a firing magnitude is applied thereto and the tube is excited by incident photons, an A.C. source of potential, a voltage step-up transformer connecting said A.C. potential source to said tube, a one-shot multivibrator and a full-wave rectifier connecting the primary circuit of said transformer to the input of said multivibrator.

10. The U-V detecting system set forth in claim 9 including a test source of high frequency voltage, a test switch, a glow discharge tube at said U-V detector tube connected to said test voltage source via said primary circuit and said test switch, filter means in said primary circuit for isolating said high frequency test current from said U-V detector tube and from said multivibrator, and a utilization circuit connected to the output of said multivibrator.

References Cited in the file of this patent

UNITED STATES PATENTS

| | | |
|---|---|---|
| 2,967,941 | Hamelink | Jan. 10, 1961 |
| 2,983,818 | Constable | May 9, 1961 |
| 2,984,746 | Speh et al. | May 16, 1961 |
| 2,993,995 | Pinckaers | July 25, 1961 |
| 3,012,146 | Hamelink | Dec. 5, 1961 |